(12) United States Patent
Mansour et al.

(10) Patent No.: US 10,566,826 B2
(45) Date of Patent: Feb. 18, 2020

(54) DEVICE CONTROL FOR WIRELESS CHARGING

(71) Applicant: Intel Corporation, Santa Clara, CA (US)

(72) Inventors: Anna-Marie Mansour, Seattle, WA (US); Kahyun Kim, Portland, OR (US); Andrea Tortoriello, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/294,593

(22) Filed: Mar. 6, 2019

(65) Prior Publication Data

US 2019/0267829 A1 Aug. 29, 2019

Related U.S. Application Data

(63) Continuation of application No. 14/971,472, filed on Dec. 16, 2015, now Pat. No. 10,256,656.

(51) Int. Cl.
| | |
|---|---|
| *H02J 7/02* | (2016.01) |
| *G06F 3/01* | (2006.01) |
| *H04B 5/00* | (2006.01) |
| *H02J 50/10* | (2016.01) |
| *H02J 7/00* | (2006.01) |

(52) U.S. Cl.
CPC ............. *H02J 7/025* (2013.01); *G06F 3/016* (2013.01); *H02J 50/10* (2016.02); *H04B 5/0037* (2013.01); *H02J 2007/0096* (2013.01)

(58) Field of Classification Search
CPC ................................. H02J 7/025; G06F 3/016

USPC ......................................................... 320/108
See application file for complete search history.

(56) References Cited

U.S. PATENT DOCUMENTS

| | | | |
|---|---|---|---|
| 8,903,456 B2 | 12/2014 | Chu et al. | |
| 9,653,938 B2* | 5/2017 | Lundgren | ............. H02J 7/0047 |
| 9,979,221 B2* | 5/2018 | Chin | ....................... H02J 7/025 |
| 2012/0052923 A1 | 3/2012 | Park | |
| 2013/0117552 A1 | 5/2013 | Kim | |

(Continued)

FOREIGN PATENT DOCUMENTS

| | | |
|---|---|---|
| KR | 20040028170 A | 4/2004 |
| KR | 20040099910 A | 12/2004 |

OTHER PUBLICATIONS

"U.S. Appl. No. 14/971,472, Non Final Office Action dated Jun. 1, 2018", 10 pgs.

(Continued)

*Primary Examiner* — Richard V Muralidar
(74) *Attorney, Agent, or Firm* — Schwegman Lundberg & Woessner, P.A.

(57) ABSTRACT

Embodiments of a system and method for controlling a device charging on a wireless charger are generally described herein. A method may include disabling, in response to determining that the device is currently charging on the wireless charger, haptic feedback at the device, determining whether the device is in a night mode or a day mode, in response to determining that the device is in the night mode and currently charging on the wireless charger, disabling notifications of the device, and enabling, in response to determining that the device is in the day mode, the haptic feedback and the notifications when the device has been removed from the wireless charger.

21 Claims, 5 Drawing Sheets

(56) References Cited

U.S. PATENT DOCUMENTS

2016/0378186 A1    12/2016  Kim
2017/0179749 A1    6/2017  Mansour et al.

OTHER PUBLICATIONS

"U.S. Appl. No. 14/971,472, Notice of Allowance dated Nov. 30, 2018", 8 pgs.

"U.S. Appl. No. 14/971,472, Response Filed Sep. 4, 2018 to Non Final Office Action dated Jun. 1, 2018", 13 pgs.

"Silent on Charge at Night", [Online]. Retrieved from the Internet: <URL: https://play.google.com/store/apps/details?id=uk.co.douglash.silentoncharge, (Sep. 4, 2011), 2 pgs.

Campolo, Domenico, et al., "Neuro-Developmental Engineering: towards early diagnosis of neuro-developmental disorders", New Developments in Biomedical Engineering (2010), (Jan. 1, 2010), 685-714.

Garlin, Natt, "Hands-on with Glowdeck, a beautiful 3-in-1 wireless charger, speaker and notifcation center", [Online]. Retrieved from the Internet: <URL: http://thenextweb.com/gadgets/2014/04/08/hands-on-glowdeck/, (Apr. 8, 2014), 9 pgs.

\* cited by examiner

DEVICE CONTROL FOR WIRELESS CHARGING

PRIORITY APPLICATION

This application is a continuation of U.S. application Ser. No. 14/971,472, filed Dec. 16, 2015, which is incorporated herein by reference in its entirety.

BACKGROUND

According to some technical analysts, there will be over 50 billion connected "things" by the year 2020. This will completely transform current infrastructures and will drive new innovations in industry, products, and services. Internet-of-Things (IoT) is term that represents devices and systems that communicate over a network, such as the internet. The devices and systems may include haptic feedback.

Wireless chargers are a growing new technology that allow a device to charge without physically plugging the device into a wall charger. Some IoT devices and systems use wireless charging to recharge.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Internet-of-Things (IoT) devices, such as wearable devices, and mobile devices, such as mobile phones, are increasingly being configured to use wireless charging to recharge batteries in the devices. However, there is a lack of context-relevant or context-aware behaviors for the wireless chargers and devices. Wearable devices tethered to a smart phone for example, may indicate an alert via haptic feedback or a light or lights regarding various important items (e.g., emails, calls, notifications, etc.). When these devices are sitting on a wireless charger, the devices may be misaligned from a charging surface. For example, when a notification is received by a device, causing the device to vibrate with haptic feedback from activating a haptic motor, the device may move. When the device moves, it may become misaligned from the charging surface, such that it receives a less efficient charge or does not charge at all. While a user may have set up preferences to cause vibration when a notification is received, the user may not want the vibration to misalign the device from the charger.

In an example, a misaligned device may be disruptive from a user perspective. For example, if a device is charging by a user's bed when the user is trying to sleep and the device is creating audible or visual noise, the user's sleep may be disrupted. Devices may vibrate and light up redundantly, such as multiple times in a night when a user is not engaging with the device between notifications. Additionally, if the device becomes misaligned from the charger, the user may not notice and may expect the device to be charged when it in fact, was not.

When a device is placed on a wireless charger, the charger and device may establish a connection to determine the user context. The context may depend on various conditions, such as device power status, device charger coupling status, user preferences, notification importance, or time of the day. For different examples of user context including combinations of different states, the device notification behavior when the device is charging wirelessly may change. For example, the device may disable haptic feedback or an on-device LED light.

In an example, a wireless charger may not receive a device status except for the battery level information. When a device is placed on a wireless charger that does not receive the device status (except for the battery level information), the device may not turn on automatically when the device is charging on the wireless charger. When the device does not automatically turn on, the user may not remember to turn the device on when the user removes the device from the charger. The user may risk not remembering to do so and may potentially missing important notifications.

Figure 1:
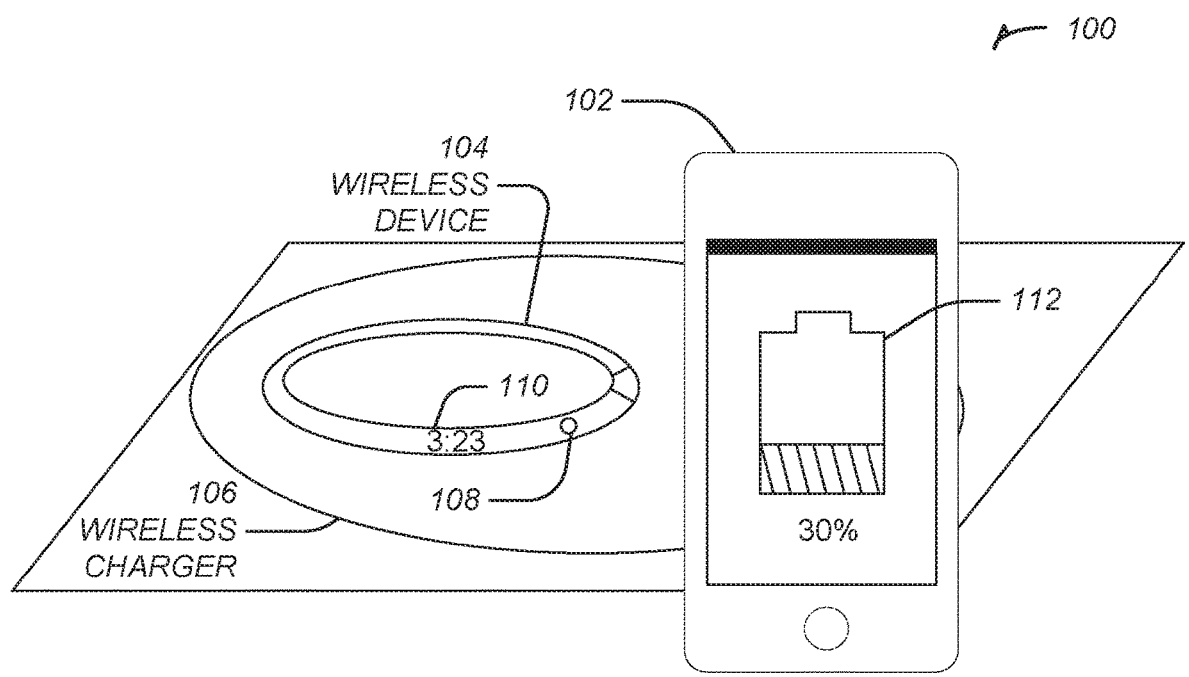
FIG. 1 illustrates a system for wirelessly charging devices in accordance with some embodiments.

FIG. 1 illustrates a system 100 for wirelessly charging devices in accordance with some embodiments. The system 100 includes a wireless charger 106, such as a charging pad, wireless charger built in to a table, portable wireless charger, or the like. The system 100 includes devices configured to charge on the wireless charger, such as wearable device 104 and mobile device 102. In an example, any device capable of charging with the wireless charger 106 may be used in system 100. The example devices 102 and 104 shown in system 100 are illustrative.

In an example, system 100 includes the wearable device 104 and the mobile device 102, charging on the wireless charger 106. The wearable device 104 and the mobile device 102 may be configured to provide haptic feedback. For example, if a notification is sent to the wearable device 104 or the mobile device 102, the wearable device 104 or the mobile device 102 may vibrate. In an example, when the wearable device 104 or the mobile device 102 is placed on the wireless charger 106, the haptic feedback may be disabled. For example, the wearable device 104 or the mobile device 102 may detect that it is receiving a charge wirelessly, and automatically turn off haptic feedback. When the wearable device 104 or the mobile device 102 is removed from the wireless charger 106, the wearable device 104 or the mobile device 102 may turn the haptic feedback back on. If the haptic feedback was not on when the wearable device 104 or the mobile device 102 was placed on the wireless charger 106, the wearable device 104 or the mobile device 102 may do nothing when charging, and may or may not turn on haptic feedback when it is removed from the wireless charger 106. In an example, the wearable device 104 or the mobile device 102 may control enabling/disabling of the haptic feedback or other aspects of device functionality when the wearable device 104 or the mobile device 102 is placed on the wireless charger 106. In another example, the wireless charger 106 may control enabling/disabling of the haptic feedback or other aspects of device functionality when the wearable device 104 or the mobile device 102 is charging on the wireless charger 106. In yet another example, control of enabling/disabling of the haptic feedback or other aspects of device functionality may be split between the wireless charger 106 and the wearable device 104 or the mobile device 102.

The wearable device 104 may include a light 108 or a display 110. In an example, the light 108 may illuminate when a notification is received by the wearable device 104 or a system event occurs. For example, the wearable device 104 may be a smart watch and may receive a text message. In another example, the wearable device 104 may be a fitness device and may include an alarm as a system event. In yet another example, the wearable device 104 may include an environmental sensor and may indicate a change in status (e.g., a change in light, sound, air, etc.). When the wearable device 104 is placed on the wireless charger 106, the wearable device 104 may disable the light. In another example, the light 108 may be disabled based on a set of conditions, including that the wearable device 104 is charging. The set of conditions may include a time of day, underlying aspects of the notification or system alert, user preferences, or the like. The display 110 of the wearable device 104 may be similarly disabled based on the same or a different set of conditions. The display 110 may include a clock, a screen, etc. The display 110 may change based on an incoming notification or system event.

The mobile device 102 may include a display with a battery indicator 112. In an example, the battery indicatory 112 may be displayed in response to the mobile device 102 being placed on the wireless charger 106. For example, the mobile device 102 may detect that it is receiving a wireless charge and may display the battery indicator 112. In another example, the battery indicator 112 may be displayed in response to a user input, such as a user pressing a button of the mobile device 102. The battery indicator 112 may display a percentage of charge of a battery of the mobile device 102 being charged by the wireless charger 106. In an example, the battery indicator 112 may be displayed after the battery is charged to a specified percentage or specified percentages. For example, if the battery has less than 5% when the mobile device 102 is placed on the wireless charger 106, the battery indicator 112 may be displayed when the battery reaches 30% or if the battery has more than 25% when the mobile device 102 is placed on the wireless charger 106, the battery indicator 112 may be displayed when the battery reaches 60%. Other examples may be used, such as displaying the battery indicator 112 when the battery reaches 90% or 100% charged.

To detect that the mobile device 102 or the wearable device 104 is receiving a charge (i.e., currently charging), the mobile device 102 or the wearable device 104 may include circuitry to inductively couple to the wireless charger 106. The circuitry may detect an electromagnetic field provided by the wireless charger 106 to charge the mobile device 102 or the wearable device 104.

The wearable device 104 may include the features described for the battery indicator 112 and the mobile device 102 may include the features described for the light 108 and the display 110. When the mobile device 102 or the wearable device 104 are placed on the wireless charger 106, the mobile device 102 or the wearable device 104 may begin charging. If the mobile device 102 or the wearable device 104 are off (e.g., a powered down state or a standby state) when placed on the wireless charger 106, a battery indicator (e.g., 112) may be displayed. In another example, when the mobile device 102 or the wearable device 104 are off and charging, the mobile device 102 or the wearable device 104 may disable the battery notification 112 or the display 110, respectively. In yet another example, when the mobile device 102 or the wearable device 104 are off when placed on the wireless charger 106, the mobile device 102 or the wearable device 104 may wait until the battery is charged to a predetermined level. At the predetermined level, the mobile device 102 or the wearable device 104 may automatically turn on. In another example, mobile device 102 or the wearable device 104 may turn on at the predetermined level when certain conditions are met, such as a time of day, a physical location, a previous state, user preference, or the like.

Figure 2:
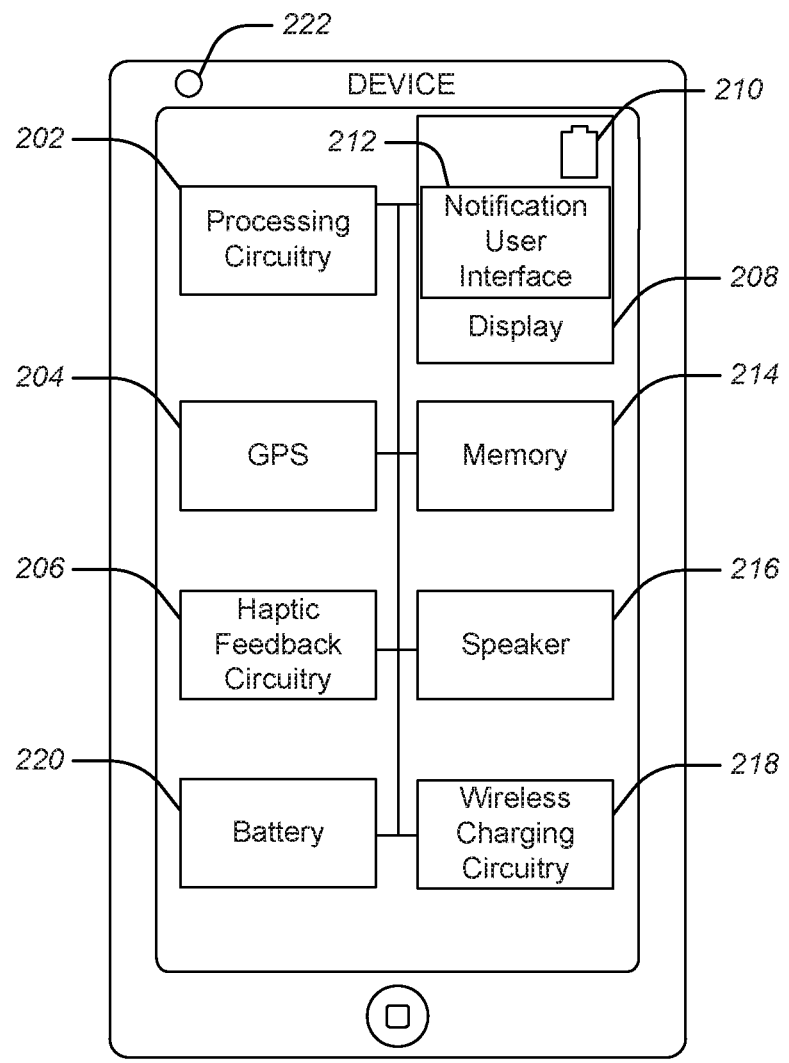
FIG. 2 illustrates a device configured to charge wirelessly in accordance with some embodiments.

FIG. 2 illustrates a device 200 configured to charge wirelessly in accordance with some embodiments. The device 200 may include processing circuitry 202, a GPS unit 204, haptic feedback circuitry 206 (e.g., to control haptic feedback and to cause haptic feedback), a display 208, memory 214, a speaker 216, wireless charging circuitry 218, a battery 220, and a light 222. The wireless charging circuitry 218 may be used to charge the battery 220 when the device 200 is placed on a wireless charger. The display 208 may include a battery indicator 210. In an example, the display 208 may include a notification user interface 212.

The wireless charging circuitry 218 may be used to charge the battery 220, where the amount of battery charge may be indicated by the battery indicator 210 on the display 208. The wireless charging circuitry 218 may be used to determine that the device 200 is currently charging on a wireless charger. The wireless charging circuitry 218 may detect an electromagnetic field and inductively couple to the wireless charger to receive the charge. The wireless charging circuitry 218 may use the electromagnetic field to charge the battery 220.

The processing circuitry 202 may be used to control the other components of the device 200. For example, the processing circuitry 202 may disable the haptic feedback circuitry 206, the light 222, the speaker 216, or the notification user interface 212 when the wireless charging circuitry 218 is active.

In an example, the GPS unit 204 may be used to determine a location or position of the device 200. The processing circuitry 202 may use the location or position of the device 200 from the GPS unit 204 with an indication from the wireless charging circuitry 218 that the battery 220 is charging to control the light 222, the haptic feedback circuitry 206, the speaker 216, or the notification user interface 212. In an example, the light 222 may include an LED light, multiple LED lights, or another type of light.

Figure 3:
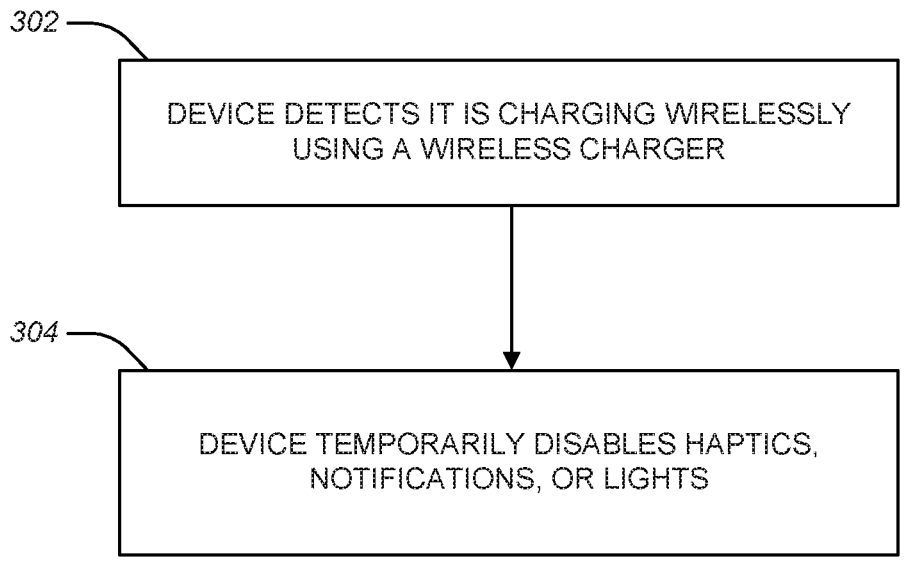
FIG. 3 illustrates a flowchart showing a technique for disabling features on a device when the device is wirelessly charging in accordance with some embodiments.

FIG. 3 illustrates a flowchart showing a technique 300 for disabling features on a device when the device is wirelessly charging in accordance with some embodiments. The technique 300 includes an operation 302 to detect that a device is charging wirelessly using a wireless charger. In response to detecting that the device is charging wirelessly using the wireless charger, the technique 300 includes an operation 304 to disable haptics, notifications, or lights on the device. Before disabling a component in operation 304, the technique 300 may include determining whether a set of conditions has been met. For example, the set of conditions may include a time-based condition.

In an example, a time-based condition may include different actions for a day mode and a night mode. For example, a night mode may include any time between 10:00 PM and 7:00 AM. The time may be determined from a device clock, a server clock, etc. The times for the night mode may be changed by a user. The day mode may include times outside the night mode (e.g., approximate 7:00 AM to 10:00 PM). In an example, when the device is determined to be in the night mode, the technique 300 may include turning off haptic feedback, notifications, and lights. In another example, when the device is determined to be in the day mode, the technique 300 may include turning off haptic feedback, but leaving notifications and lights on, if they were on when the device was placed on the wireless charger.

In another example, a condition may include whether the device is powered on or powered off. For example, when the device is powered off, it may be automatically turned on when the battery of the device reaches a specified charge (e.g., 10%). Combinations of conditions may be used as well. For example, the device may include four default states. State 1 may include conditions when the device is on, placed on the charger, and in the night mode (e.g., with default 10:00 PM to 7:00 AM, and the user may change settings). In State 1, both the haptic feedback and the device light are disabled. State 2 may include conditions when the device is on, placed on the charger, and in the day mode (e.g., with default 7:01 AM to 9:59 PM, and the user may change settings). In State 2, the haptic feedback is disabled, but the light notification stays on (if it was on when placed on the wireless charger, or may be turned on even if it was not on when the device was placed on the wireless charger. State 3 may include conditions when the device is off, placed on the charger, and in the night mode. In State 3, the device turns on automatically if it has more than 10% battery. Once the device turns on from state 3, the device may go to state 1. State 4 may include conditions when the device is off, placed on the charger, and in the day mode. In State 4, the device turns on automatically if it has more than 10% battery. Once the device turns on from State 4, the device may go to State 2.

Other conditions and states may be used including to disable and enable a speaker, a notification display, or other lights. The other conditions and states may include time-based conditions, notification-specific conditions (e.g., if a call or text is received from a specified number, always allow the notification to go through, no matter what the state), location-based conditions (e.g., when away from a home wireless charger or home GPS location, change states when wirelessly charging), device-specific conditions, or the like. In another example, a condition may include an event requirement from a calendar associated with the device. A state may include using calendar-based conditions. For example, a calendar associated with a device may include events, such as meetings with varying levels of notifications (e.g., a do-not-disturb meeting which may have a state similar to a night mode, a movie event where silencing the phone is desired, etc.). In another example, the device may include a wearable device, which may use context awareness of a different device, such as a mobile device. The mobile device state may be used to set the wearable device state when one or both is wirelessly charging. For example, if the mobile device turns silent, the wearable device may be turned to silent as well. In yet another example, a wearable device or mobile device may include geographic zones where the wearable device or the mobile device may be active or inactive, such as based on the position of the wearable device or the mobile device.

In an example, a mobile device may determine that it is wirelessly charging and the mobile device may adjust the notifications, haptics, or lights of a wearable device. The wearable device may or may not be charging with the mobile device on a wireless charger. For example, the mobile device may determine that the mobile device is wirelessly charging and that the wearable device is not wirelessly charging. In this example, the mobile device may disable notifications, haptics, or lights on the mobile device and enable notifications, haptics, or lights on the wearable device.

In another example, both the mobile device and the wearable device may be charging wirelessly. In this example, the mobile device may adjust notifications, haptics, or lights of both the mobile device and the wearable device (e.g., if notifications, haptics, or lights are enabled on the mobile device, they may be disabled on the wearable device as the wearable device may be redundant and more likely to slip off of a wireless charger than the mobile device).

In yet another example, the wearable device may be on a wireless charger, and the mobile device connected to the wearable device may determine that the wearable device is wirelessly charging. In this example, the mobile device may adjust the notifications, haptics, or lights of the wearable device in response to detecting that the wearable device is wirelessly charging, for example, by disabling the notifications, haptics, or lights.

Figure 4:
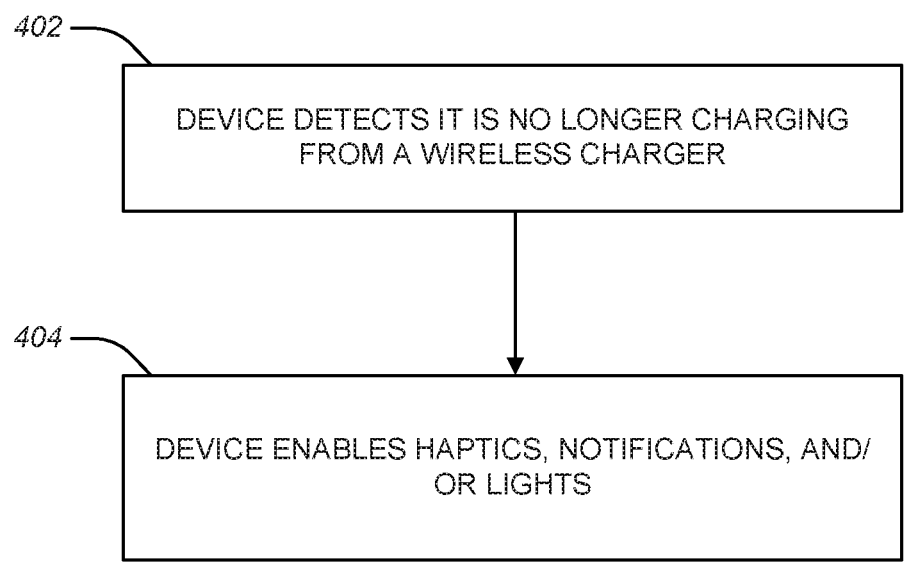
FIG. 4 illustrates a flowchart showing a technique for enabling features when a device is removed from a wireless charger in accordance with some embodiments.

FIG. 4 illustrates a flowchart showing a technique 400 for enabling features when a device is removed from a wireless charger in accordance with some embodiments. The technique 400 includes an operation 402 to detect that a device is no longer charging from a wireless charger. The technique 400 includes an operation 404 to enable haptic feedback, notifications, or lights. Operation 404 may enable haptic feedback, notifications, or lights that were disabled in operation 304 of technique 300. In an example, technique 400 may be used with and after (or before) technique 300.

In an example, when a device is taken off the wireless charger, the device may go back to the last given device notification setting. In another example, the device may retain or change notification settings when removed from the wireless charger if a mode is changed. For example, if a device is placed on the wireless charger when in a night mode with notifications off before the device is placed on the wireless charger, and the device is removed from the wireless charger during a day mode, the day mode notification settings may be retained. User preferences may be set to determine notification setting changes based on wireless charging status, day or night mode, etc.

In another example, when a device is in a night mode, the device may hold or kill push notifications received at the device (or initiated by system events) and not display them at the device. In yet another example, the device may send an indication to a server or other device that the device is in the night mode, and the server or other device may intercept notifications or messages to be sent to the device. The server or other device may never send the notifications or messages, may aggregate them to send later in a digest, or may not send them until after the device is removed from the wireless charger.

In an example, a mobile device may determine that it is no longer wirelessly charging and the mobile device may adjust the notifications, haptics, or lights of a wearable device. The wearable device may or may not be charging. For example, the mobile device may determine that the mobile device is no longer wirelessly charging and that the wearable device is not wirelessly charging. In this example, the mobile device may enable notifications, haptics, or lights on the mobile device and enable notifications, haptics, or lights on the wearable device.

In another example, when the mobile device is removed from the wireless charger, the wearable device may be charging wirelessly. In this example, the mobile device may adjust notifications, haptics, or lights of both the mobile device and the wearable device (e.g., if notifications, haptics, or lights are enabled on the mobile device, they may be disabled on the wearable device as the wearable device may be redundant).

Figure 5:
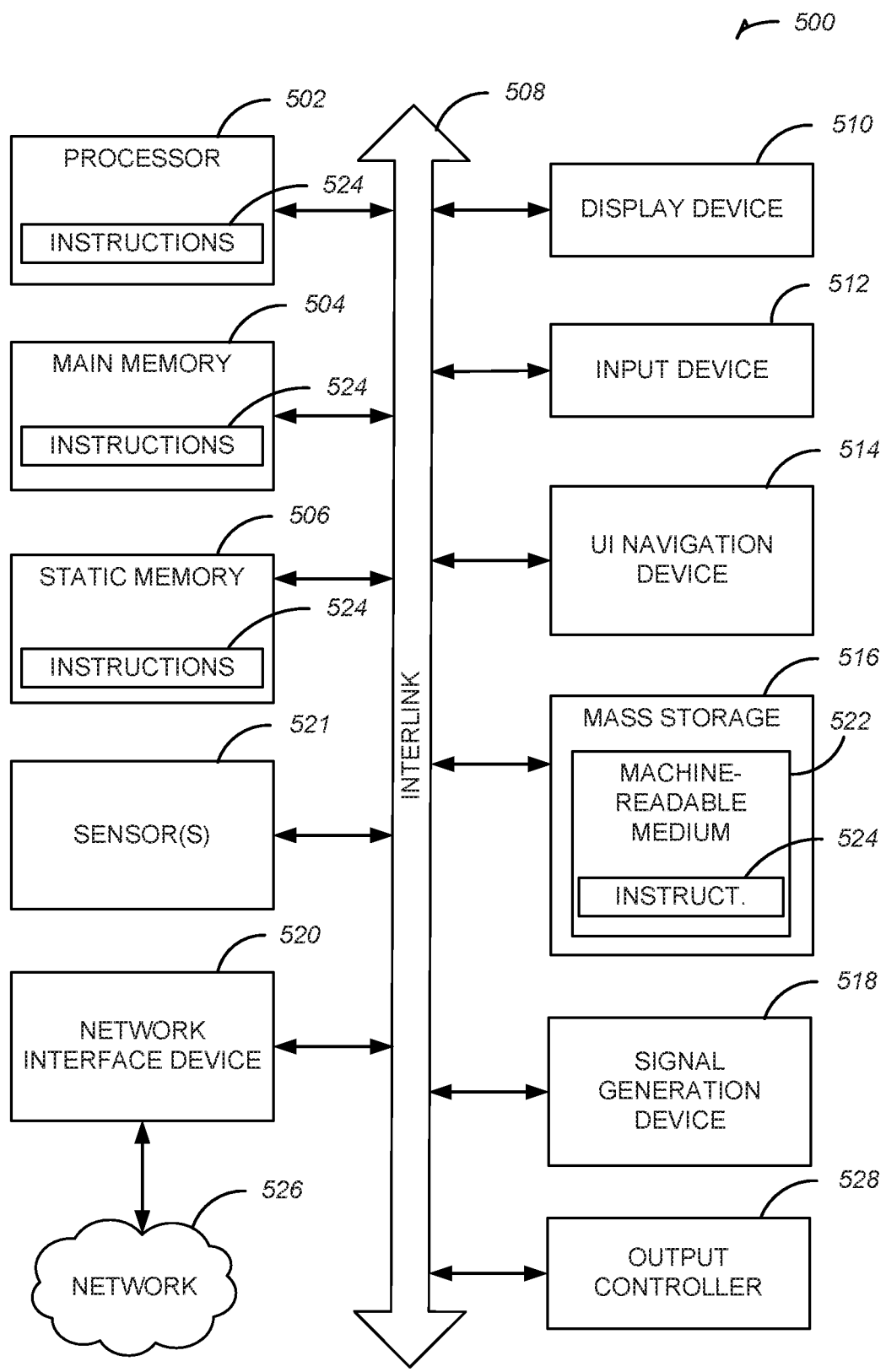
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a device configured to charge on a wireless charger, the device comprising: processing circuitry to: disable, in response to determining that the device is currently charging on the wireless charger, haptic feedback at the device; determine whether the device is in a night mode or a day mode; in response to determining that the device is in the night mode and currently charging on the wireless charger, disable notifications of the device; and enable, in response to determining that the device is in the day mode, the haptic feedback and the notifications when the device has been removed from the wireless charger.

In Example 2, the subject matter of Example 1 optionally includes, wherein in response to determining that the device is in the day mode and currently charging on the wireless charger, the processing circuitry is to enable the notifications of the device.

In Example 3, the subject matter of Example 2 optionally includes, wherein to enable the notifications of the device includes to enable the notifications of the device that were disabled in response to determining that the device was in the night mode and was charging.

In Example 4, the subject matter of any one or more of Examples 1-3 optionally include, wherein, in response to determining that the device is in the night mode and currently charging on the wireless charger, the processing circuitry is to disable a light of the device.

In Example 5, the subject matter of Example 4 optionally includes, wherein, in response to determining that the device has been removed from the wireless charger, the processing circuitry is to enable the light.

In Example 6, the subject matter of any one or more of Examples 4-5 optionally include, wherein, in response to determining that the device is in the day mode and currently charging on the wireless charger, the processing circuitry is to enable the light of the device.

In Example 7, the subject matter of any one or more of Examples 1-6 optionally include, wherein to determine whether the device is in a night mode or a day mode includes to determine whether the device is in a night mode or a day mode from a clock on the device.

In Example 8, the subject matter of any one or more of Examples 1-7 optionally include, wherein to determine whether the device is in a night mode or a day mode includes to determine whether the device is in a night mode or a day mode from a current time received from a server.

In Example 9, the subject matter of Example 8 optionally includes, wherein, in response to determining that the device is in the day mode, the processing circuitry is to determine whether a calendar linked to the device includes an entry for the current time, the entry indicating that a user of the device is busy.

In Example 10, the subject matter of Example 9 optionally includes, wherein, in response to determining that the calendar linked to the device includes the entry and the device is currently charging on the wireless charger, the processing circuitry is to disable a light and the notifications of the device.

In Example 11, the subject matter of any one or more of Examples 1-10 optionally include, wherein the processing circuitry is to determine whether a battery being charged by the wireless charger exceeds a threshold charge.

In Example 12, the subject matter of any one or more of Examples 1-11 optionally include, wherein in response to determining that the battery has a charge exceeding the threshold charge, the processing circuitry is to turn on the device while the device is currently charging on the wireless charger.

In Example 13, the subject matter of any one or more of Examples 1-12 optionally include, wherein determining that the device is currently charging on the wireless charger includes detecting an electromagnetic field using wireless charging circuitry of the device inductively coupled to the wireless charger.

Example 14 is a method of controlling a device charging on a wireless charger, the method comprising: disabling, in response to determining that the device is currently charging on the wireless charger, haptic feedback at the device; determining whether the device is in a night mode or a day mode; in response to determining that the device is in the night mode and currently charging on the wireless charger, disabling notifications of the device: and enabling, in response to determining that the device is in the day mode, the haptic feedback and the notifications when the device has been removed from the wireless charger.

In Example 15, the subject matter of Example 14 optionally includes, further comprising, in response to determining that the device is in the day mode and currently charging on the wireless charger, enabling the notifications of the device.

In Example 16, the subject matter of Example 15 optionally includes, wherein enabling the notifications of the device includes enabling the notifications of the device that were disabled in response to determining that the device was in the night mode and was charging.

In Example 17, the subject matter of any one or more of Examples 14-16 optionally include, further comprising, in response to determining that the device is in the night mode and currently charging on the wireless charger, disabling a light of the device.

In Example 18, the subject matter of any one or more of Examples 16-17 optionally include, further comprising, in response to determining that the device has been removed from the wireless charger, enabling the light.

In Example 19, the subject matter of any one or more of Examples 16-18 optionally include, further comprising, in response to determining that the device is in the day mode and currently charging on the wireless charger, enabling the light of the device.

In Example 20, the subject matter of any one or more of Examples 14-19 optionally include, wherein determining whether the device is in a night mode or a day mode includes determining whether the device is in a night mode or a day mode from a clock on the device.

In Example 21, the subject matter of any one or more of Examples 14-20 optionally include, wherein determining whether the device is in a night mode or a day mode includes determining whether the device is in a night mode or a day mode from a current time received from a server.

In Example 22, the subject matter of Example 21 optionally includes, further comprising, in response to determining that the device is in the day mode, determining whether a calendar linked to the device includes an entry for the current time, the entry indicating that a user of the device is busy.

In Example 23, the subject matter of Example 22 optionally includes, further comprising, in response to determining that the calendar linked to the device includes the entry and the device is currently charging on the wireless charger, disabling a light and the notifications of the device.

In Example 24, the subject matter of any one or more of Examples 14-23 optionally include, further comprising determining whether a battery being charged by the wireless charger exceeds a threshold charge.

In Example 25, the subject matter of any one or more of Examples 14-24 optionally include, further comprising, in response to determining that the battery has a charge exceeding the threshold charge, turning on the device while the device is currently charging on the wireless charger.

In Example 26, the subject matter of any one or more of Examples 14-25 optionally include, wherein determining that the device is currently charging on the wireless charger includes detecting an electromagnetic field using wireless charging circuitry of the device inductively coupled to the wireless charger.

Example 27 is at least one machine-readable medium including instructions for operation of a computing system, which when executed by a machine, cause the machine to perform operations of any of the methods of Examples 14-26.

Example 28 is an apparatus comprising means for performing any of the methods of Examples 14-26.

Example 29 is at least one machine readable medium including instructions that, when executed, cause the machine to perform operations for controlling a device charging on a wireless charger, the operations comprising: disabling, in response to determining that the device is currently charging on the wireless charger, haptic feedback at the device; determining whether the device is in a night mode or a day mode; in response to determining that the device is in the night mode and currently charging on the wireless charger, disabling notifications of the device; and enabling, in response to determining that the device is in the day mode, the haptic feedback and the notifications when the device has been removed from the wireless charger.

In Example 30, the subject matter of Example 29 optionally includes, further comprising, in response to determining that the device is in the day mode and currently charging on the wireless charger, enabling the notifications of the device.

In Example 31, the subject matter of Example 30 optionally includes, wherein enabling the notifications of the device includes enabling the notifications of the device that were disabled in response to determining that the device was in the night mode and was charging.

In Example 32, the subject matter of any one or more of Examples 29-31 optionally include, further comprising, in response to determining that the device is in the night mode and currently charging on the wireless charger, disabling a light of the device.

In Example 33, the subject matter of any one or more of Examples 31-32 optionally include, further comprising, in response to determining that the device has been removed from the wireless charger, enabling the light.

In Example 34, the subject matter of any one or more of Examples 31-33 optionally include, further comprising, in response to determining that the device is in the day mode and currently charging on the wireless charger, enabling the light of the device.

In Example 35, the subject matter of any one or more of Examples 29-34 optionally include, wherein determining whether the device is in a night mode or a day mode includes determining whether the device is in a night mode or a day mode from a clock on the device.

In Example 36, the subject matter of any one or more of Examples 29-35 optionally include, wherein determining whether the device is in a night mode or a day mode includes determining whether the device is in a night mode or a day mode from a current time received from a server.

In Example 37, the subject matter of Example 36 optionally includes, further comprising, in response to determining that the device is in the day mode, determining whether a calendar linked to the device includes an entry for the current time, the entry indicating that a user of the device is busy.

In Example 38, the subject matter of Example 37 optionally includes, further comprising, in response to determining that the calendar linked to the device includes the entry and the device is currently charging on the wireless charger, disabling a light and the notifications of the device.

In Example 39, the subject matter of any one or more of Examples 29-38 optionally include, further comprising determining whether a battery being charged by the wireless charger exceeds a threshold charge.

In Example 40, the subject matter of any one or more of Examples 29-39 optionally include, further comprising, in response to determining that the battery has a charge exceeding the threshold charge, turning on the device while the device is currently charging on the wireless charger.

In Example 41, the subject matter of any one or more of Examples 29-40 optionally include, wherein determining that the device is currently charging on the wireless charger includes detecting an electromagnetic field using wireless charging circuitry of the device inductively coupled to the wireless charger.

Example 42 is an apparatus configured to charge on a wireless charger, the apparatus comprising: means for disabling, in response to determining that the device is currently charging on the wireless charger, haptic feedback at the device; means for determining whether the device is in a night mode or a day mode; in response to determining that the device is in the night mode and currently charging on the wireless charger, means for disabling notifications of the device; and means for enabling, in response to determining that the device is in the day mode, the haptic feedback and the notifications when the device has been removed from the wireless charger.

In Example 43, the subject matter of Example 42 optionally includes, further comprising, in response to determining that the device is in the day mode and currently charging on the wireless charger, means for enabling the notifications of the device.

In Example 44, the subject matter of Example 43 optionally includes, wherein the means for enabling the notifications of the device include means for enabling the notifications of the device that were disabled in response to determining that the device was in the night mode and was charging.

In Example 45, the subject matter of any one or more of Examples 42-44 optionally include, further comprising, in response to determining that the device is in the night mode and currently charging on the wireless charger, means for disabling a light of the device.

In Example 46, the subject matter of any one or more of Examples 44-45 optionally include, further comprising, in response to determining that the device has been removed from the wireless charger, means for enabling the light.

In Example 47, the subject matter of any one or more of Examples 44-46 optionally include, further comprising, in response to determining that the device is in the day mode and currently charging on the wireless charger, means for enabling the light of the device.

In Example 48, the subject matter of any one or more of Examples 42-47 optionally include, wherein the means for determining whether the device is in a night mode or a day mode include means for determining whether the device is in a night mode or a day mode from a clock on the device.

In Example 49, the subject matter of any one or more of Examples 42-48 optionally include, wherein the means for determining whether the device is in a night mode or a day mode include means for determining whether the device is in a night mode or a day mode from a current time received from a server.

In Example 50, the subject matter of Example 49 optionally includes, further comprising, in response to determining that the device is in the day mode, means for determining whether a calendar linked to the device includes an entry for the current time, the entry indicating that a user of the device is busy.

In Example 51, the subject matter of Example 50 optionally includes, further comprising, in response to determining that the calendar linked to the device includes the entry and the device is currently charging on the wireless charger, means for disabling a light and the notifications of the device.

In Example 52, the subject matter of any one or more of Examples 42-51 optionally include, further comprising means for determining whether a battery being charged by the wireless charger exceeds a threshold charge.

In Example 53, the subject matter of any one or more of Examples 42-52 optionally include, further comprising, in response to determining that the battery has a charge exceeding the threshold charge, means for turning on the device while the device is currently charging on the wireless charger.

In Example 54, the subject matter of any one or more of Examples 42-53 optionally include, wherein the means for determining that the device is currently charging on the wireless charger include means for detecting an electromagnetic field using wireless charging circuitry of the device inductively coupled to the wireless charger.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A device configured to charge on a wireless charger, the device comprising:
   processing circuitry to:
   determine that the device has been placed on the wireless charger;
   control a wearable device to disable, in response to determining that the device has been placed on the wireless charger, haptic feedback at the wearable device;
   determine that the device has been removed from the wireless charger; and
   control the wearable device to enable, in response to determining that the device has been removed from the wireless charger, haptic feedback at the wearable device.

2. The device of claim 1, wherein the processing circuitry is further to disable, in response to determining that the device has been placed on the wireless charger, haptic feedback at the device.

3. The device of claim 1, wherein to control the wearable device to disable haptic feedback at the wearable device, the processing circuitry is further to first determine that the wearable device has been placed on the wireless charger.

4. The device of claim 1, wherein the processing circuitry is further to control the wearable device to disable notifications at the wearable device, in response to determining that the device has been placed on the wireless charger.

5. The device of claim 1, wherein the processing circuitry is further to:
   determine whether the device is in a night mode or a day mode; and
   in response to determining that the device is in the night mode and has been placed on the wireless charger, control the wearable device to disable notifications at the wearable device.

6. The device of claim 5, wherein the processing circuitry is further to control the wearable device to enable, in response to determining that the device is in the day mode, the haptic feedback and the notifications at the wearable device when the device has been removed from the wireless charger.

7. The device of claim 1, wherein the processing circuitry is further to determine whether a battery of the device being charged by the wireless charger exceeds a threshold charge, and in response to determining that the battery has a charge exceeding the threshold charge, the processing circuitry is to turn on the device, from an off mode, while the device is on the wireless charger.

8. A method of operating a device charging on a wireless charger, the method implemented using processing circuitry of the device, the method comprising:
   determining, using the processing circuitry, that the device has been placed on the wireless charger;
   controlling, using the processing circuitry, a wearable device to disable, in response to determining that the device has been placed on the wireless charger, haptic feedback at the wearable device;
   determining, using the processing circuitry, that the device has been removed from the wireless charger; and
   controlling, using the processing circuitry, the wearable device to enable, in response to determining that the device has been removed from the wireless charger, haptic feedback at the wearable device.

9. The method of claim 8, further comprising disabling, using the processing circuitry, in response to determining that the device has been placed on the wireless charger, haptic feedback at the device.

10. The method of claim 8, wherein controlling the wearable device to disable haptic feedback at the wearable device includes first determining, using the processing circuitry, that the wearable device has been placed on the wireless charger.

11. The method of claim 8, further comprising controlling, using the processing circuitry, the wearable device to disable notifications at the wearable device, in response to determining that the device has been placed on the wireless charger.

12. The method of claim 8, further comprising:
   determining whether the device is in a night mode or a day mode; and
   in response to determining that the device is in the night mode and has been placed on the wireless charger, controlling the wearable device to disable notifications at the wearable device.

13. The method of claim 12, further comprising controlling the wearable device to enable, in response to determining that the device is in the day mode, the haptic feedback and the notifications at the wearable device when the device has been removed from the wireless charger.

14. The method of claim 8, further comprising determining whether a battery of the device being charged by the wireless charger exceeds a threshold charge, and in response to determining that the battery has a charge exceeding the threshold charge, the processing circuitry is to turn on the device, from an off mode, while the device is on the wireless charger.

15. At least one non-transitory machine readable medium including instructions that, when executed by processing circuitry of a device charging on a wireless charger, cause the processing circuitry to perform operations for controlling a wearable device, the operations comprising:
   determining, using the processing circuitry, that the device has been placed on the wireless charger;
   controlling, using the processing circuitry, the wearable device to disable, in response to determining, using the processing circuitry, that the device has been placed on the wireless charger, haptic feedback at the wearable device;
   determining, using the processing circuitry, that the device has been removed from the wireless charger; and
   controlling, using the processing circuitry, the wearable device to enable, in response to determining that the device has been removed from the wireless charger, haptic feedback at the wearable device.

16. The at least one machine readable medium of claim 15, wherein the operations further comprise disabling, using the processing circuitry, in response to determining that the device has been placed on the wireless charger, haptic feedback at the device.

17. The at least one machine readable medium of claim 15, wherein controlling the wearable device to disable haptic feedback at the wearable device includes first determining, using the processing circuitry, that the wearable device has been placed on the wireless charger.

18. The at least one machine readable medium of claim 15, wherein the operations further comprise controlling, using the processing circuitry, the wearable device to disable notifications at the wearable device, in response to determining that the device has been placed on the wireless charger.

19. The at least one machine readable medium of claim 15, wherein the operations further comprise:
   determining whether the device is in a night mode or a day mode; and
   in response to determining that the device is in the night mode and has been placed on the wireless charger, controlling the wearable device to disable notifications at the wearable device.

20. The at least one machine readable medium of claim 19, wherein the operations further comprise controlling the wearable device to enable, in response to determining that the device is in the day mode, the haptic feedback and the notifications at the wearable device when the device has been removed from the wireless charger.

21. The at least one machine readable medium of claim 15, wherein the operations further comprise determining whether a battery of the device being charged by the wireless charger exceeds a threshold charge, and in response to determining that the battery has a charge exceeding the threshold charge, the processing circuitry is to turn on the device, from an off mode, while the device is on the wireless charger.

* * * * *